(12) United States Patent
Serna et al.

(10) Patent No.: US 12,313,213 B2
(45) Date of Patent: May 27, 2025

(54) CASE FOR A PORTABLE ELECTRONIC DEVICE

(71) Applicant: ACCO Brands Corporation, Lake Zurich, IL (US)

(72) Inventors: Erica Serna, Livingston, CA (US); Wilson Tse, Burnaby (CA); Alex Klinkman, Campbell, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 198 days.

(21) Appl. No.: 17/970,286

(22) Filed: Oct. 20, 2022

(65) Prior Publication Data

US 2023/0130700 A1 Apr. 27, 2023

Related U.S. Application Data

(60) Provisional application No. 63/271,811, filed on Oct. 26, 2021.

(51) Int. Cl.
*A45C 11/00* (2006.01)
*F16M 11/22* (2006.01)

(52) U.S. Cl.
CPC ............ *F16M 11/22* (2013.01); *A45C 11/003* (2025.01); *A45C 2200/15* (2013.01); *F16M 2200/08* (2013.01)

(58) Field of Classification Search
CPC ........ A45C 2011/003; A45C 2011/002; A45C 2011/001; A45C 2200/15;
(Continued)

(56) References Cited

U.S. PATENT DOCUMENTS 4,991,812 A * 2/1991 MacEwan ............... A47B 19/08
248/459
8,382,059 B2 2/2013 Le Gette et al.
(Continued)

FOREIGN PATENT DOCUMENTS

GB 2507977 A 5/2014
GB 2512884 A 10/2014
(Continued)

OTHER PUBLICATIONS

Cellular Outfitter, "Machine Built-In Kickstand Magnetic Mount Capability Heavy-Duty Mobile Phone Case, Black for Galaxy A52 5G," available at <https://www.cellularoutfitter.com/collections/samsung-galaxy-a52-5g/products/machine-built-in-kickstand-magnetic-mount-capability-heavy-duty-mobile-phone-case-black-hr-qbmchn-5ga52-bk?variant=39405892206680&utm_source=google&utm_medium=cpc&utm_term=1035436_2_65262&utm_campaign=PLA&utm_source=google&utm_medium=cpc&campaignid=1701248796&adgroupi> web page available at least as early as Aug. 19, 2021 (1 page).
(Continued)

*Primary Examiner* — King M Chu
(74) *Attorney, Agent, or Firm* — Michael Best & Friedrich LLP

(57) ABSTRACT

A case for a portable electronic device includes a cavity defined by a plurality of sidewalls and a rear wall and configured to support the portable electronic device therein, and a kickstand arrangement coupled to the rear wall, the kickstand arrangement comprising a first kickstand rotatable about a first rotational axis between a stowed position and a support position and a second kickstand rotatable about a second rotational axis transverse to the first rotational axis, wherein the second kickstand is configured to rotate into an
(Continued)

auxiliary support position in which the second kickstand extends between the rear wall and the first kickstand.

21 Claims, 8 Drawing Sheets

(58) Field of Classification Search
CPC ............ A45C 2200/1633; A45C 11/00; F16M 2200/08; F16M 11/22; F16M 11/38; F16M 13/022; G06F 2200/1633
USPC .......................... 206/320, 45.24, 45.23, 762
See application file for complete search history.

(56) References Cited

U.S. PATENT DOCUMENTS

| | | | |
|---|---|---|---|
| 8,424,830 B2* | 4/2013 | Yang | A47B 23/044 248/459 |
| 8,857,773 B2 | 10/2014 | Krohn et al. | |
| 8,960,634 B2 | 2/2015 | Le Gette et al. | |
| 8,978,883 B2 | 3/2015 | Gandhi et al. | |
| 9,185,954 B2 | 11/2015 | Cheung et al. | |
| 9,225,377 B1* | 12/2015 | Hart | H04B 1/3888 |
| 9,267,638 B2 | 2/2016 | Le Gette et al. | |
| 9,374,918 B2 | 6/2016 | Krohn et al. | |
| 9,537,524 B2 | 1/2017 | Chiang et al. | |
| 9,538,675 B2 | 1/2017 | Le Gette et al. | |
| 9,571,149 B2 | 2/2017 | Poon et al. | |
| 9,671,829 B2 | 6/2017 | Ho | |
| 9,685,986 B2 | 6/2017 | Lee et al. | |
| 9,723,735 B1 | 8/2017 | Kim | |
| 9,755,688 B1 | 9/2017 | Mckenzie | |
| 9,788,621 B2 | 10/2017 | Kim | |
| 9,838,063 B2 | 12/2017 | Poon et al. | |
| 9,861,001 B1 | 1/2018 | Miller et al. | |
| 9,888,103 B2 | 2/2018 | Toner | |
| 9,925,390 B2 | 3/2018 | Yehezkel | |
| 9,936,780 B2 | 4/2018 | Tu et al. | |
| 10,128,888 B2 | 11/2018 | Poon et al. | |
| 10,148,306 B2 | 12/2018 | Lee et al. | |
| 10,171,121 B1 | 1/2019 | Miller et al. | |
| 10,326,487 B2 | 6/2019 | Mody et al. | |
| 10,484,034 B2 | 11/2019 | Poon et al. | |
| 10,667,586 B2 | 6/2020 | Tu et al. | |
| 10,791,393 B2* | 9/2020 | Englert | H04M 1/04 |
| 10,826,551 B2 | 11/2020 | Poon | |
| 10,842,238 B2 | 11/2020 | Gandhi et al. | |
| 10,855,821 B1 | 12/2020 | Chou et al. | |
| 2010/0072334 A1 | 3/2010 | Le Gette et al. | |
| 2013/0094131 A1 | 4/2013 | O'Donnell et al. | |
| 2013/0098788 A1 | 4/2013 | McCarville et al. | |
| 2014/0031095 A1 | 1/2014 | Herrera et al. | |
| 2014/0076748 A1 | 3/2014 | Padilla | |
| 2014/0291174 A1 | 10/2014 | Chung | |
| 2016/0066453 A1 | 3/2016 | Quehl et al. | |
| 2016/0249472 A1 | 8/2016 | Tu | |
| 2016/0309009 A1 | 10/2016 | Haskell | |
| 2017/0201285 A1 | 7/2017 | Liu | |
| 2017/0240119 A1 | 8/2017 | Tezino | |
| 2019/0120479 A1 | 4/2019 | Haskel | |
| 2020/0128687 A1 | 4/2020 | Ku et al. | |
| 2020/0162120 A1 | 5/2020 | Poon et al. | |
| 2020/0192429 A1 | 6/2020 | Wu et al. | |
| 2020/0288832 A1 | 9/2020 | Tu et al. | |
| 2021/0050875 A1 | 2/2021 | Poon | |
| 2021/0057928 A1 | 2/2021 | Tivas | |
| 2021/0059370 A1 | 3/2021 | Del Toro et al. | |
| 2021/0083710 A1 | 3/2021 | Poon et al. | |
| 2021/0084132 A1 | 3/2021 | Chou et al. | |
| 2021/0175921 A1 | 6/2021 | Poon | |
| 2021/0234568 A1 | 7/2021 | Poon et al. | |

FOREIGN PATENT DOCUMENTS

| | | |
|---|---|---|
| JP | 2020061110 A | 4/2020 |
| TW | 201638699 A | 11/2016 |
| WO | WO2011156275 A2 | 12/2011 |

OTHER PUBLICATIONS

Supcase, "Microsoft Surface Pro Unicorn Beetle Pro Rugged Case-Black," available at <https://www.supcase.com/products/microsoft-surface-pro-6-unicorn-beetle-pro-holster-case?variant=32473227231310&utm_source=google&utm_medium=cpc&adpos=&scid=scplpSUP-Surface-Pro6-UBPro-Black-Black&sc_intid=SUP-Surface-Pro6-UBPro-Black-Black&gclid=Cj0KCQjwvO2IBhCzARIsALw3ASq1rDHoStZdzGpVN-Zr1rk5S2LVx61TFx8ABIcio-ciiTZSNIyzkHMaAmfBEALw_wcB> web page available at least as early as Aug. 19, 2021 (1 page).
Pelican, "Pelican Voyager Case with Kickstand—iPad 9.7-inch," available at <https://www.att.com/buy/accessories/cases/pelican-voyager-case-with-kickstand-ipad-9-7-inch-black.html> web page available at least as early as Aug. 19, 2021 (1 page).

* cited by examiner

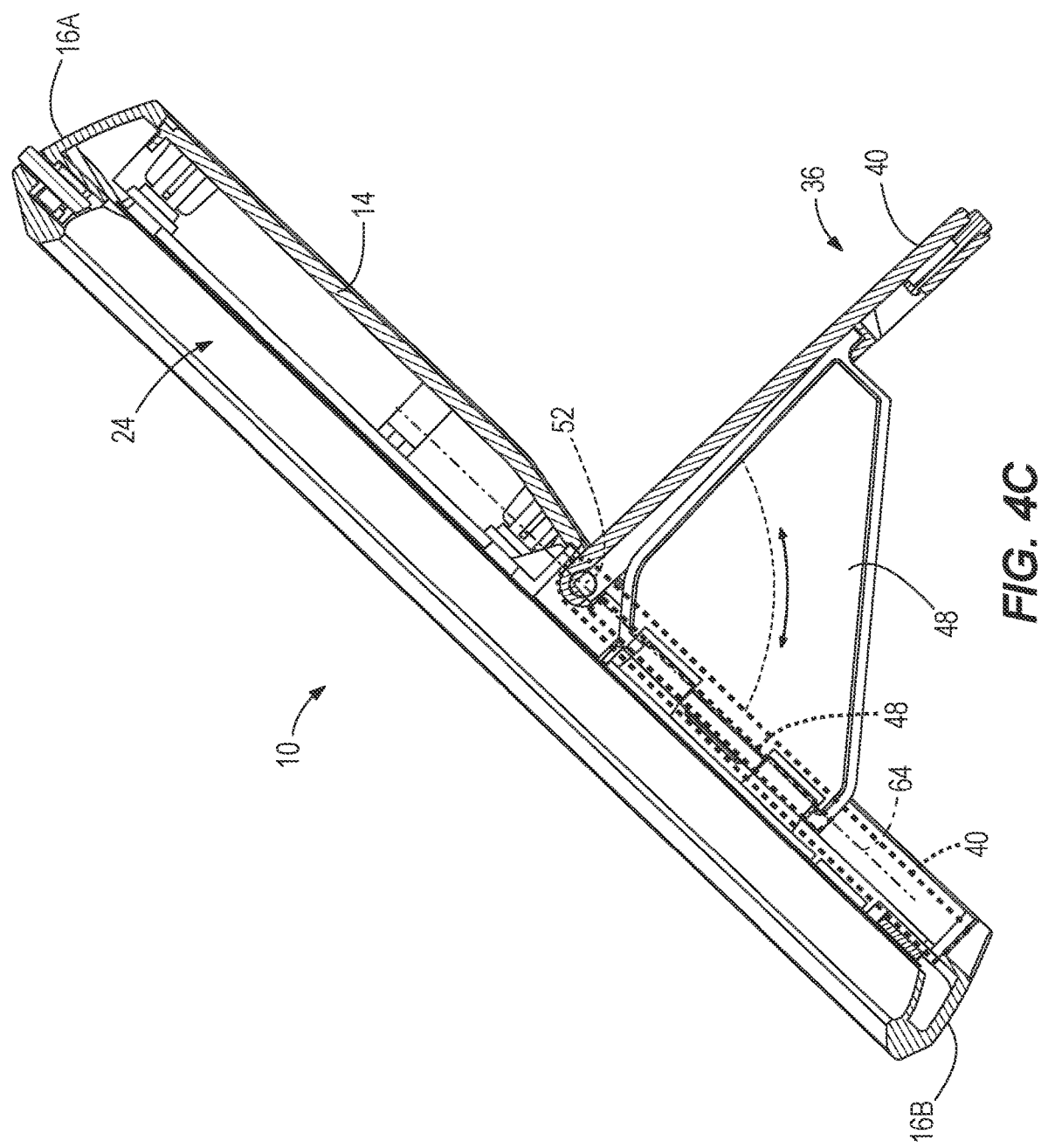

CASE FOR A PORTABLE ELECTRONIC DEVICE

CROSS-REFERENCE TO RELATED APPLICATIONS

The present application claims benefit of U.S. Provisional Patent Application No. 63/271,811, filed Oct. 26, 2021, the entire contents of which are incorporated herein by reference.

BACKGROUND

Portable electronic devices such as tablets computers, cellular phones such as smart phones, and laptop computers can be placed within cases to protect the portable electronic device. Some cases may provide added functionality such as incorporating a screen protector for covering a screen of the portable electronic device, ports for coupling peripheral devices to the portable electronic device, or a kickstand for supporting the portable electronic device at an angle relative to a tabletop surface.

SUMMARY

The present disclosure relates to a case for a portable electronic device. The case includes a cavity defined by a plurality of sidewalls and a rear wall and configured to support the portable electronic device therein, and a kickstand arrangement coupled to the rear wall, the kickstand arrangement comprising a first kickstand rotatable about a first rotational axis between a stowed position and a support position and a second kickstand rotatable about a second rotational axis transverse to the first rotational axis, wherein the second kickstand is configured to rotate into an auxiliary support position in which the second kickstand extends between the rear wall and the first kickstand.

In some embodiments, the present disclosure relates to the case further having a third kickstand rotatable about a third rotational axis that is parallel to the second rotational axis. The third kickstand is configured to rotate into an auxiliary support position in which the third kickstand extends between the rear wall and the first kickstand. In some embodiments, the present disclosure relates to the case, where the second rotational axis extends perpendicular to the first rotational axis. In some embodiments, the present disclosure relates to the case, where the second kickstand is coupled to the rear wall, and wherein the second kickstand is rotatable into selective engagement with the first kickstand. In some embodiments, the present disclosure relates further to the case, where, when the first kickstand is in the support position and the second kickstand is in the auxiliary support position, the case is configured to support the portable electronic device in a first orientation, in which a first sidewall of the plurality of sidewalls and the first kickstand engage the horizontal support surface, and in a second orientation, in which a second sidewall of the plurality of sidewalls, opposite the first sidewall, and the first kickstand engage the horizontal support surface.

In further embodiments, the present disclosure relates to a case for a portable electronic device. The case includes a cavity defined by a plurality of sidewalls and a rear wall and configured to support the portable electronic device therein, and a kickstand arrangement coupled to the rear wall, the kickstand arrangement comprising a first kickstand rotatable about a first rotational axis between a first stowed position and a first support position and a second kickstand rotatable about a second rotational axis transverse to the first rotational axis between a second stowed position and a second support position, wherein the second kickstand is inoperable to rotate from the second stowed position to the second support position when the first kickstand is in the first stowed position, and wherein the second kickstand is operable to rotate from the second stowed position to the second support position when the first kickstand is in the first support position.

In still further embodiments, the present disclosure relates to a method of using a case for a portable electronic device. The method includes locating the portable electronic device within a cavity of the case, the cavity defined by a plurality of sidewalls and a back wall, rotating a first kickstand relative to the back wall of the case about a first rotational axis, rotating a second kickstand relative to the back wall of the case about a second rotational axis and into engagement with the first kickstand, the second rotational axis extending transverse to the first rotational axis, and supporting the case on a support surface via a first sidewall of the plurality of sidewalls and the first kickstand.

BRIEF DESCRIPTION OF THE DRAWINGS

FIG. 4C is a cross-sectional side view of the case of FIG. 1 illustrating the stowed and support positions.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Figure 1:
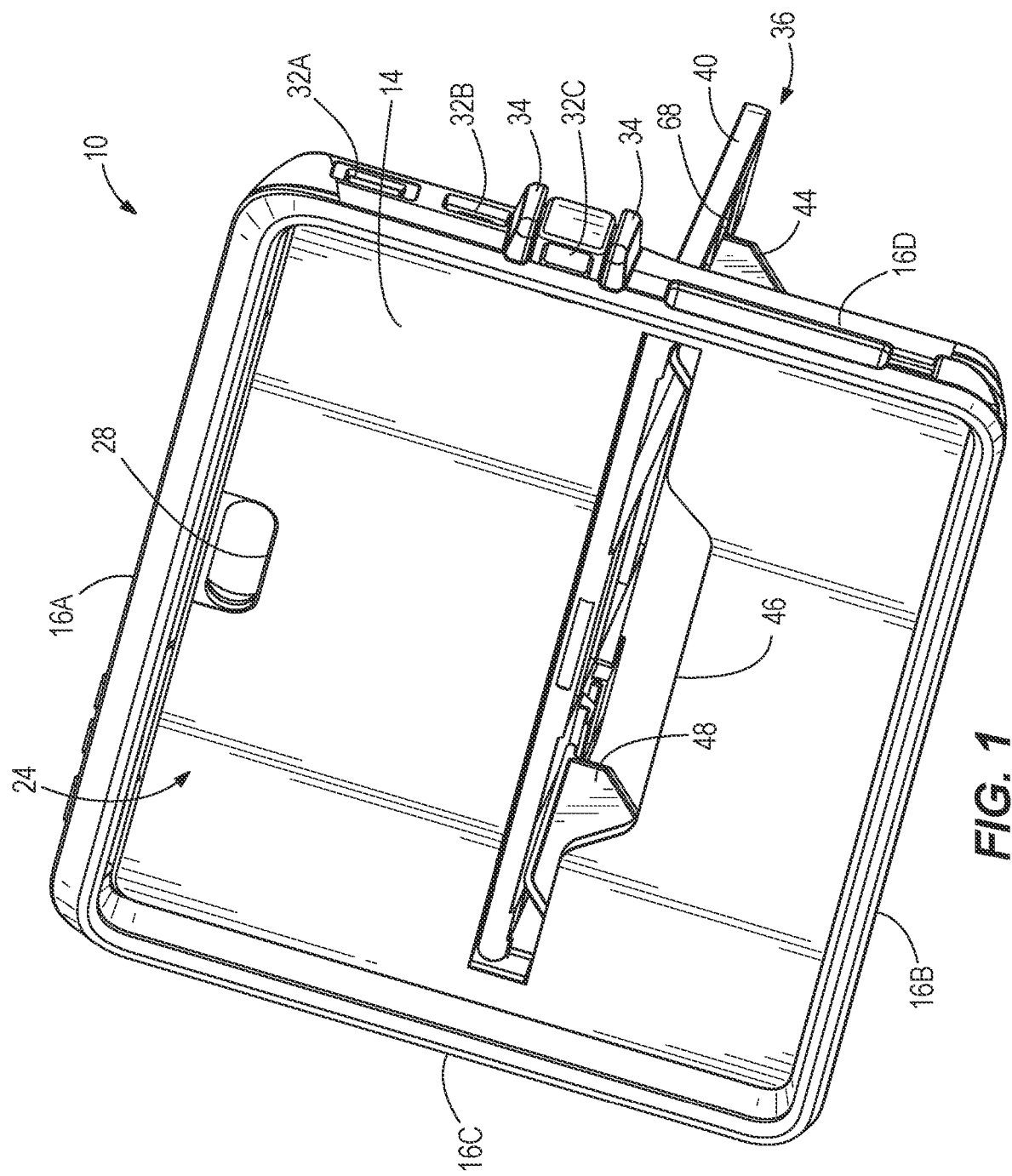
FIG. 1 is a front perspective view of a case for a portable electronic device, the case having a kickstand.
Figure 2:
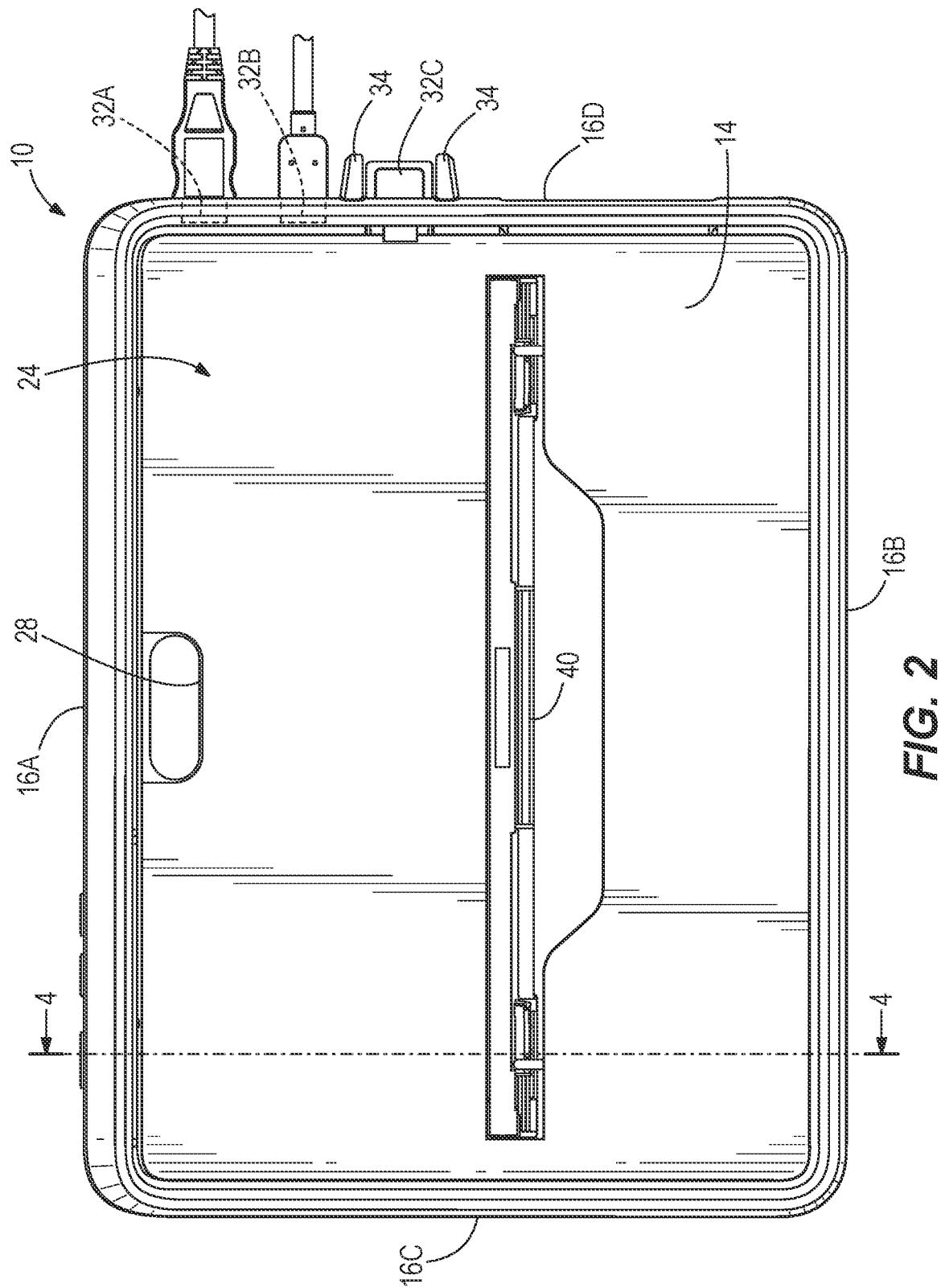
FIG. 2 is a front view of the case of FIG. 1.
Figure 7:
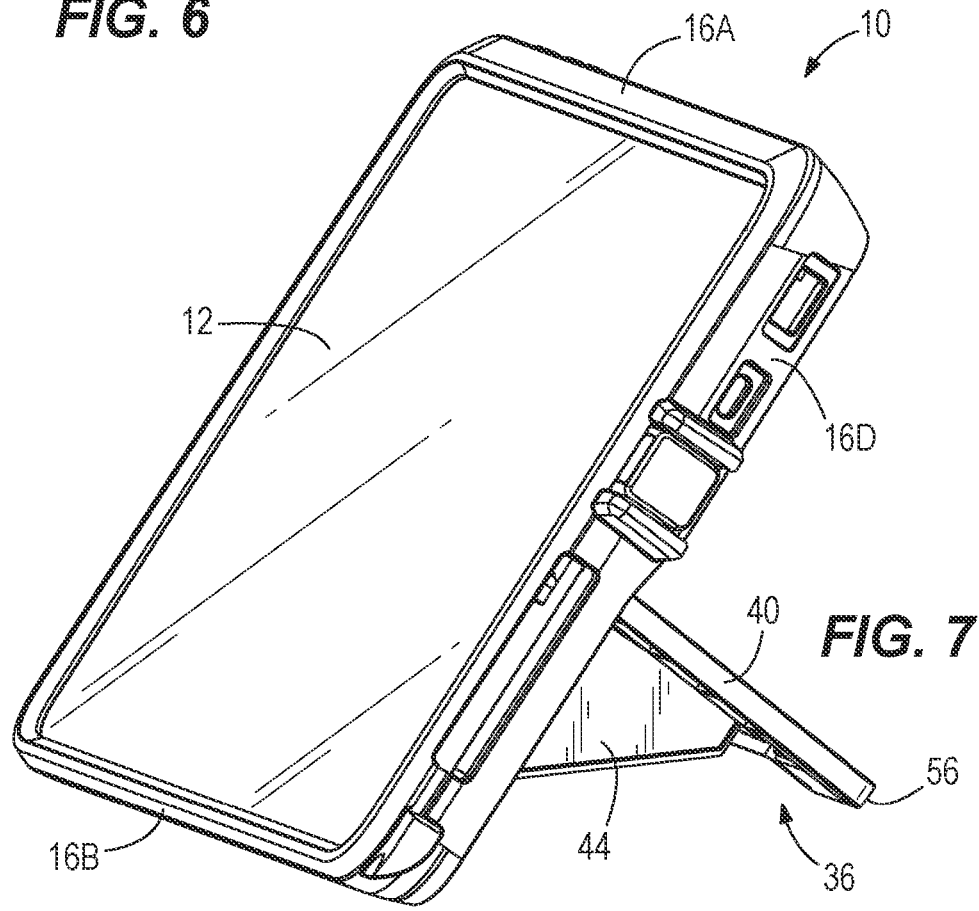
FIG. 7 is a front perspective view of the case of FIG. 1 with a portable electronic device positioned therein.

FIGS. 1-7 illustrate a case 10 for a portable electronic device 12 (FIG. 7) such as a tablet computer, a smart phone, or a laptop computer. As shown in FIG. 1, the case 10 includes a rear wall 14 and four sidewalls 16A, 16B, 16C, 16D that collectively define a cavity 24 into which the portable electronic device 12 is insertable. The four sidewalls 16A-D include an upper sidewall 16A, a lower sidewall 16B, a left sidewall 16C, and a right sidewall 16D. As shown in FIG. 7, with the portable electronic device 12 positioned against the rear wall 14, the sidewalls 16A-D extend around the sides of the portable electronic device 12 to retain the portable electronic device 12 within the cavity 24 of the case 10. In some embodiments, the sidewalls 16A-16D extend partially around the edge of the portable electronic device 12 and over a portion of the front surface of the portable electronic device 12. In some embodiments, the case 10 is a rugged case formed of materials having thickness, rigidity, and/or impact resistance qualities that provide increased protection for the portable electronic device 12 located therein. In some embodiments, the rear wall 14 may be formed as a single wall that functions as an external wall on the rear of the case 10 and as the wall within the cavity 24 that abuts a rear of the portable electronic device 12. In other embodiments, the rear wall 14 may be hollow with a first portion 14A of the rear wall 14 (FIG. 4A) abutting a rear of the portable electronic device 12 and a second portion 14B of the rear wall 14 (FIG. 4A) functioning as an external wall of the rear of the case 10 with a hollow portion defined between the first and second portions 14A, 14B. In some embodiments, the hollow portion is accessible (e.g., by moving the second portion 14B relative to the first portion 14A) to provide storage for small items such as credit cards and identification cards.

With continued reference to FIG. 1, the case 10 includes a camera opening 28 in the rear wall 14 that is aligned with a camera (not shown) located on a rear surface of the portable electronic device 12 when the portable electronic device 12 is positioned within the case 10. The case 10 further includes a plurality of ports and/or connectors 32A, 32B, 32C located in the right sidewall 16D for electrically coupling the portable electronic device 12 to peripheral devices such as input devices (e.g., keyboard, mouse, etc.), power devices (portable battery back, charging cable, etc.) or output devices (e.g., an external monitor, a projection device, etc.). Protective ears or protrusions 34 extend outward from the right sidewall 16D directly adjacent to opposite sides of the USB-C connector 32C. The protrusions 34 limit the impact force felt by the USB-C connector 32C in the case of an impact on the right sidewall 16D of the case 10. In some embodiments, the case 10 supports peripheral devices such as an external battery that can extend a battery life of the portable electronic device 12 or a storage container for receiving and storing external components such as cables or personal items such as credit cards or identification cards.

As shown in greater detail in FIGS. 3-5B, the case 10 includes a kickstand arrangement 36 that extends outward from a rear side (opposite the cavity 24) of the rear wall 14. The kickstand arrangement 36 includes a first kickstand 40, a second kickstand 44, and a third kickstand 48. The first kickstand 40 may also be referred to as a main kickstand. The first kickstand 40 is coupled to the rear wall 14 at a central location (between the upper and lower sidewalls 16A, 16B) and is rotatable relative to the remainder of the case 10 (and the portable electronic device 12 positioned within the case 10) about a first rotational axis 52. The first rotational axis 52 extends parallel to the upper and lower sidewalls 16A, 16B. The first kickstand 40 is substantially rectangular and extends from the first rotational axis 52 to a ground engagement edge 56. The first rotational axis 52 may also be parallel to a horizontal support surface 50 that supports the case 10, such as a desk or tabletop.

As shown in FIG. 4C, the first kickstand 40 is rotatable about the first rotational axis 52 between a first position and a second position. The first position is a stowed position in which the first kickstand 40 is positioned against the rear wall 14 of the case 10, the first kickstand 40 extends substantially parallel to the rear wall 14, and the ground engagement edge 56 is positioned adjacent the rear wall 14. In the stowed position, the first kickstand 40 covers the second and third kickstands 44, 48 such that the second and third kickstands are hidden and sandwiched between the first kickstand 40 and the rear wall 14. The second and third kickstands 44, 48 are also inaccessible from outside of the cavity 24 when the kickstands 40, 44, 48 are in the stowed position. An opening 46 in the rear wall 14 provides access to the second and third kickstands 44, 48 through the cavity 24 when no electronic device is located therein.

Figure 4A:
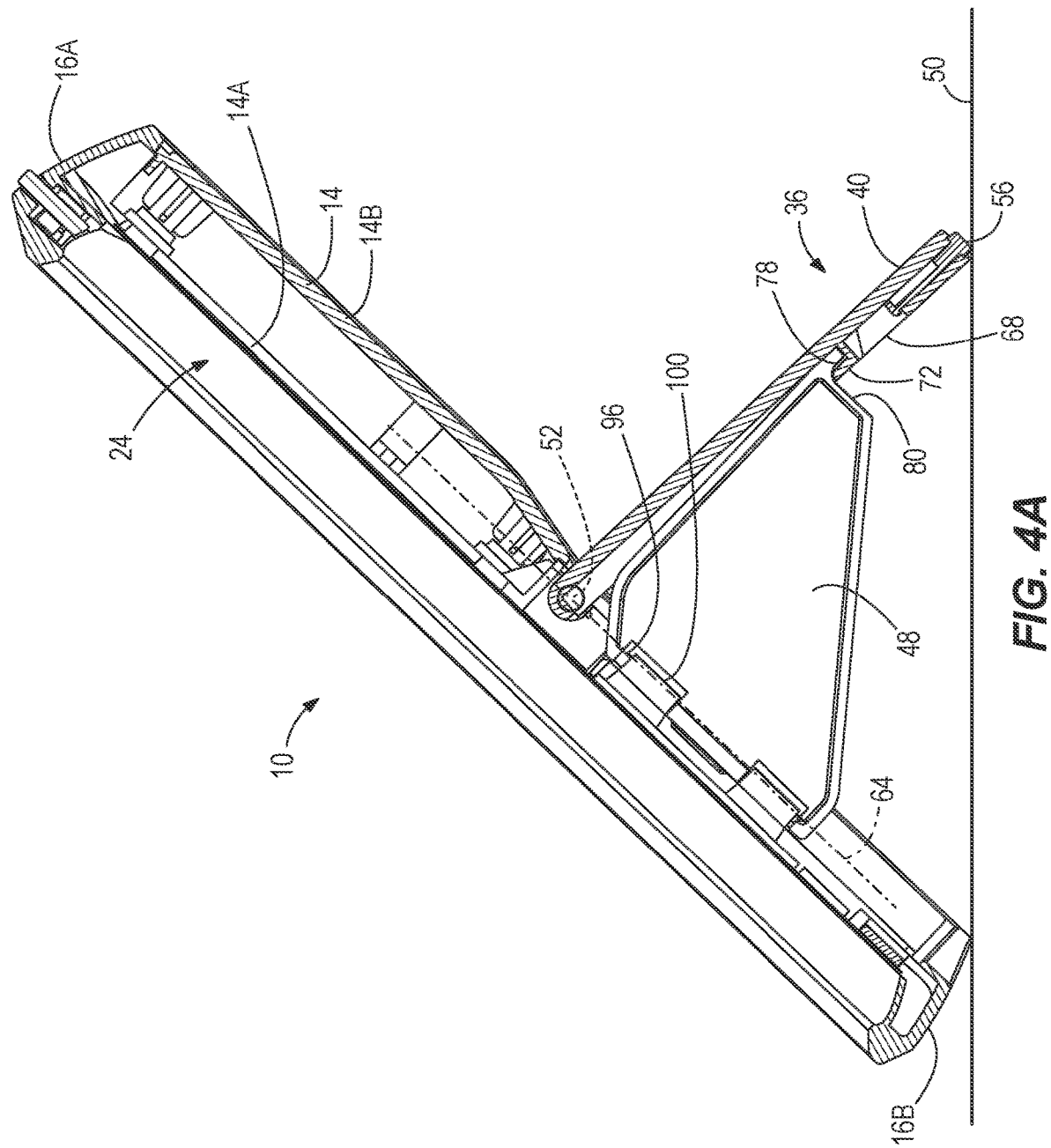
FIG. 4A is a cross-sectional side view of the case of FIG. 1 taken along section line 4-4 of FIG. 2.

The first and third kickstands 40, 48 are illustrated in the stowed position in via dashed lines in FIG. 4C. The second position is a support position in which the first kickstand 40 supports the case 10 and the portable electronic device 12 at an angle relative to the horizontal support surface 50, as shown in FIG. 4A. In the second position, the first kickstand 40 extends outward and rearward from rear wall 14 to a position that is non-parallel to the rear wall 14. As shown in FIG. 4A, the position may be substantially perpendicular (i.e., 90±10 degrees) to the rear wall, though other embodiments may position the first kickstand 40 at other angles in the second position. In the second position, the ground engagement edge 56 is positioned on the horizontal support surface 50 at a location rearward of the rear wall 14. A portion of the rear wall 14 contacts the first kickstand 40 and inhibits further rotation of the first kickstand 40 beyond the second position.

Figure 5B:
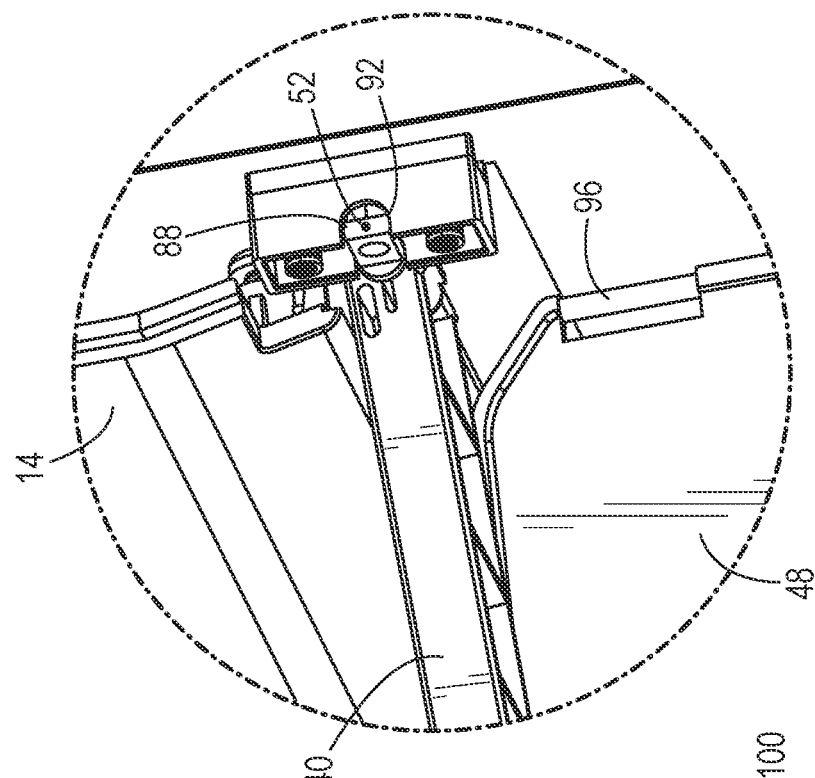
FIG. 5B is an enlarged cutaway view of the hinge of the kickstand with some components removed.
Figure 5A:
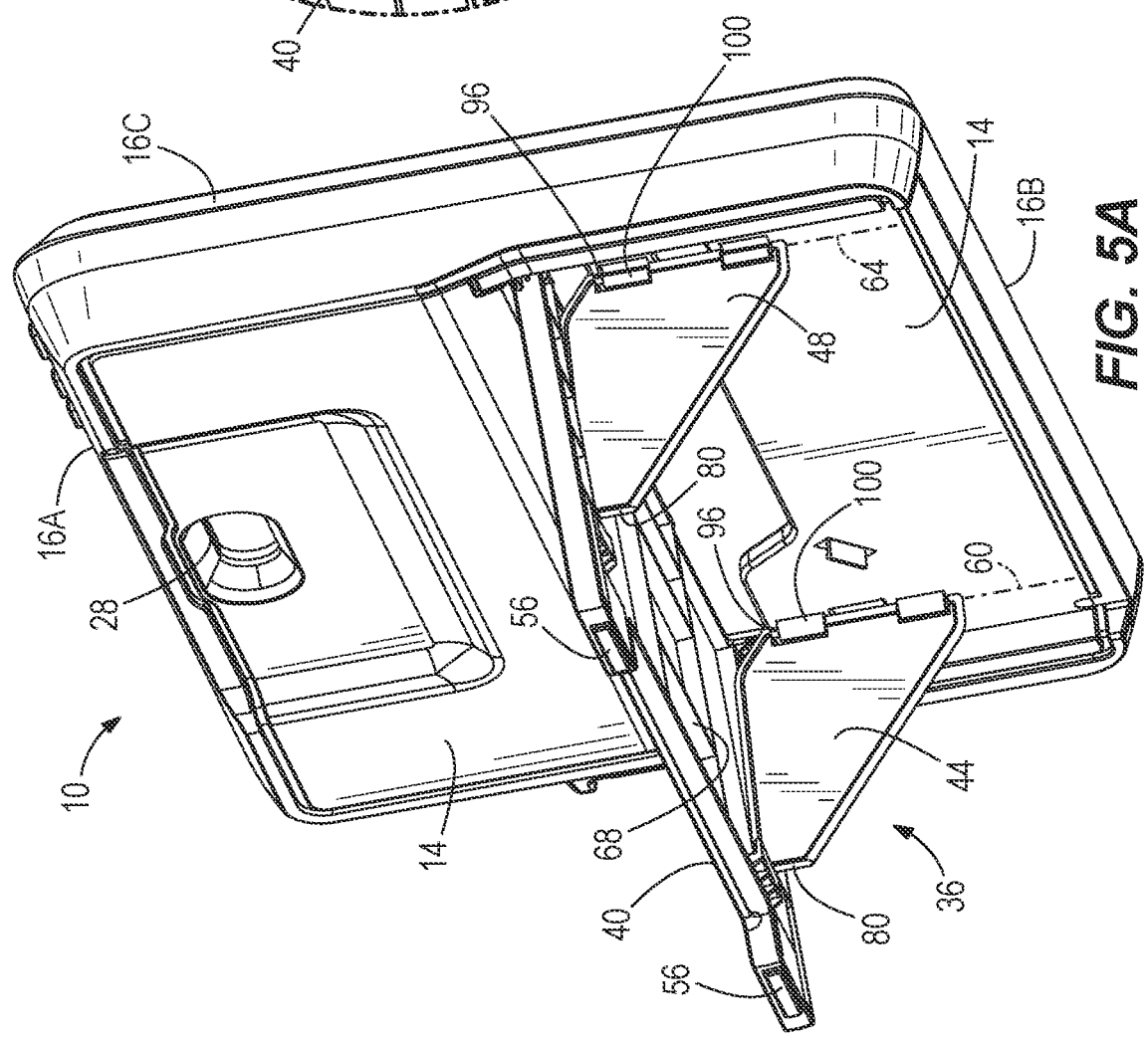
FIG. 5A is a rear perspective view of the case of FIG. 1.
Figure 6:
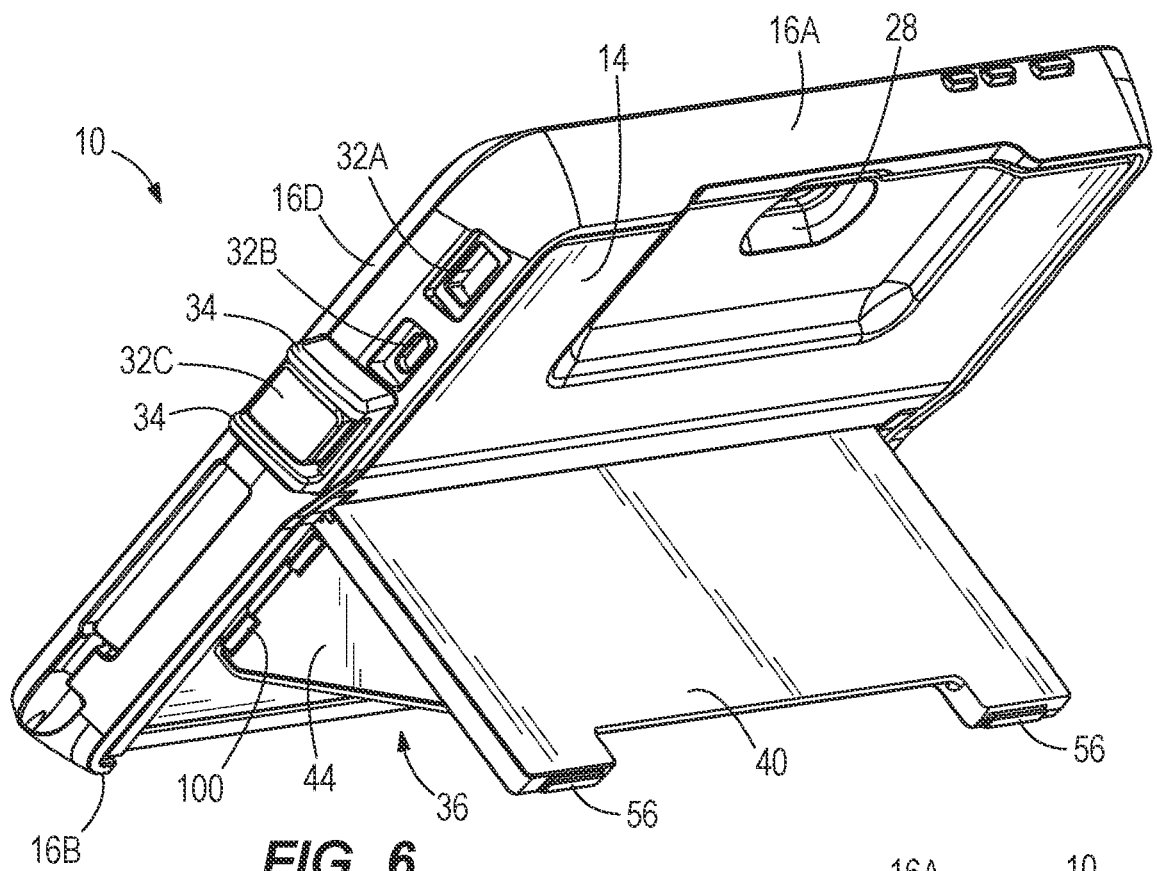
FIG. 6 is another rear perspective view of the case of FIG. 1.

FIGS. 5A-5B show the first kickstand 40 mounted to the rear wall 14 of the case 10. A post 88 (e.g., friction hinge) is coupled to the first kickstand 40 at each of the widthwise edges of the first kickstand 40 (only one is shown, though the other is a mirrored copy of the one shown). The rotational axis 52 is defined by the posts 88. Each post 88 engages a slot or opening 92 defined within the rear wall 14 such that the posts 88 (and the first kickstand 40 coupled thereto) are rotatable relative to the rear wall 14.

The second and third kickstands 44, 48 are substantially similar to one another in shape and size (and dissimilar from the first kickstand 40, smaller than the first kickstand 40) and are mounted to the rear wall 14 between the rear wall 14 and the first kickstand 40. The second and third kickstands 44, 48 may also be referred to as auxiliary kickstands. Although the illustrated case 10 includes two auxiliary kickstands, in other embodiments, the case 10 may only include one auxiliary kickstand. The second kickstand 44 is rotatable about a second rotational axis 60, and the third kickstand 48 is rotatable about a third rotational axis 64 that is parallel to and coplanar with the second rotational axis 60. The third rotational axis 64 is also spaced apart from the second rotational axis 60. Each of the second and third rotational axes 60, 64 extend perpendicular to the first rotational axis 52. As such, the second and third kickstands 44, 48 rotate about parallel axes 60, 64. In a first, or stowed, position, each one of the second and third kickstands 44, 48 is rotated about their respective axis 60, 64 such that they lay flat against the rear wall 14 of the case 10. The first position of the second and third kickstands 44, 48 is shown in dashed lines in FIG. 3. In the first position, the second and third kickstands 44, 48 are positioned between the first kickstand 40 and the rear wall 14. The second and third kickstands 44, 48 may be located in the first position when the first kickstand 40 is located in the first position and in the second position.

Figure 3:
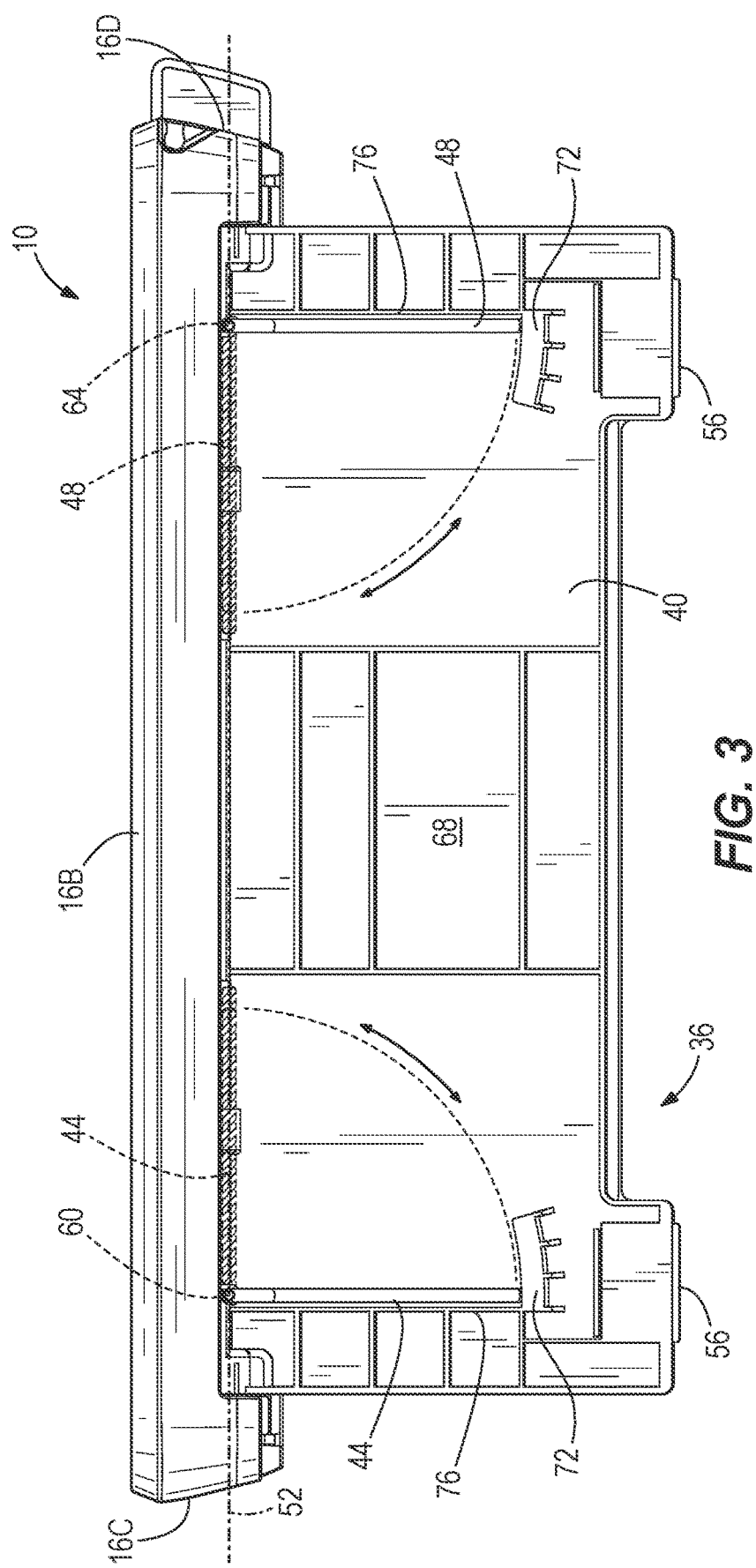
FIG. 3 is a bottom view of the case of FIG. 1 with the kickstand extended.

Each one of the second and third kickstands 44, 48 is rotatable about its respective axis 60, 64 from the first position to a second, or auxiliary support, position. In their respective first positions, the second and third kickstands 44, 48 extend from their rotational axes 60, 64 towards one another such that the second and third kickstands 44, 48 are folded towards one another into a parallel or coplanar arrangement. As shown in FIG. 3, to rotate from the first position to the second position, the second and third kickstands 44, 48 rotate in opposite rotational directions, with the second kickstand 44 rotating in a clockwise direction (when viewed from below as shown in FIG. 3) and the third kickstand 48 rotating in an opposite, counterclockwise direction. In the second position, the second and third kickstands 44, 48 extend outward from the rear wall 14 towards the first kickstand 40 and into engagement with the first kickstand 40. The second and third kickstands 44, 48 are only rotatable to the second position when the first kickstand 40 is in the second position. In the second position, the second and third kickstands 44, 48 engage an underside 68 of the first kickstand 40 to maintain the first kickstand 40 in the second position. The first kickstand 40 is not movable from the second position to the first position until the second and third kickstands 44, 48 are first rotated out of their respective second positions.

In an alternative embodiment, the second and third kickstands 44, 48 may be mounted to the underside 68 of the first kickstand 40 and rotatable relative to the first kickstand 40 into engagement with the rear wall 14 of the case 10.

Each of the second and third kickstands 44, 48 are mounted to the rear wall 14 of the case 10. A post 96 is coupled to (e.g., integrally formed with) the respective kickstand 44, 48 and defines the respective rotational axis 60, 64. Each post 96 is positioned within a clip 100 (e.g., via a snap fit) that is coupled to the rear wall 14 such that the posts 96 (and the kickstands 44, 48 coupled thereto) are rotatable relative to the rear wall 14.

With continued reference to FIG. 3, the underside 68 of the first kickstand 40 includes a peripheral guide 72 and a rotational stop 76 that interface with the second kickstand 44 and a similar (mirrored) guide 72 and rotational stop 76 that interface with the third kickstand 48. The peripheral guide 72 is a boss feature that extends rearward from the underside 68 of the first kickstand 40 and guides movement of the respective second or third kickstand 44, 48 relative to the first kickstand 40 when rotating the second or third kickstand 44, 48 into their second position. The peripheral guide 72 engages the outer distal edge 80 (spaced apart from and parallel to the rotational axis 60, 64) of the respective kickstand 40, 44. As shown in FIG. 4A, the second and third kickstands 40, 44 may include a lip 78, or pin, that slides within the peripheral guide 72. In some embodiments, an interface between the lip 78 and the peripheral guide 72 is relatively tight such that the lip 78 cannot freely slide out of the peripheral guide 72 without sufficient force by a user. The rotational stop 76, similar to the peripheral guide 72, is a boss features that extends rearward from the underside 68 of the first kickstand 40. The rotational stop 76 engages the respective kickstand 44, 48 when the kickstand 44, 48 is in the second position and prohibits motion of the kickstand 44, 48 beyond the second position. As shown, the second position is substantially perpendicular to the first position.

In the alternative embodiment where the second and third kickstands 44, 48 are mounted to the underside 68 of the first kickstand 40, the peripheral guide 72 and rotational stop 76 are located on the rear wall 14 of the case 10. Additionally or alternatively, the second and third kickstands 44, 48 may be held in position relative to the first kickstand 40 (or relative to the rear wall 14) by other suitable mechanisms other than the peripheral guides 72 and the lips 78. For example, the second and third kickstands 44, 48 may be held by magnets, snap- or detent-type connections, and the like.

With the first, second, and third kickstands 40, 44, 48 in their respective first (stowed) positions, the kickstand arrangement 36 is folded against the rear wall 14 of the case 10 and the case 10 can be supported flat on a horizontal support surface 50 such that a screen of the portable electronic device 12 extends parallel to the horizontal support surface 50. With the first, second, and third kickstands 40, 44, 48 in their respective second (support) positions, the kickstand arrangement 36 is configured to support that remainder of the case 10 (and the portable electronic device 12 located therein) at an angle relative to the horizontal support surface 50. As shown in FIG. 4A, the kickstand arrangement 36 supports the portable electronic device 12 at an approximately forty-five-degree angle relative to the horizontal surface.

Figure 4B:
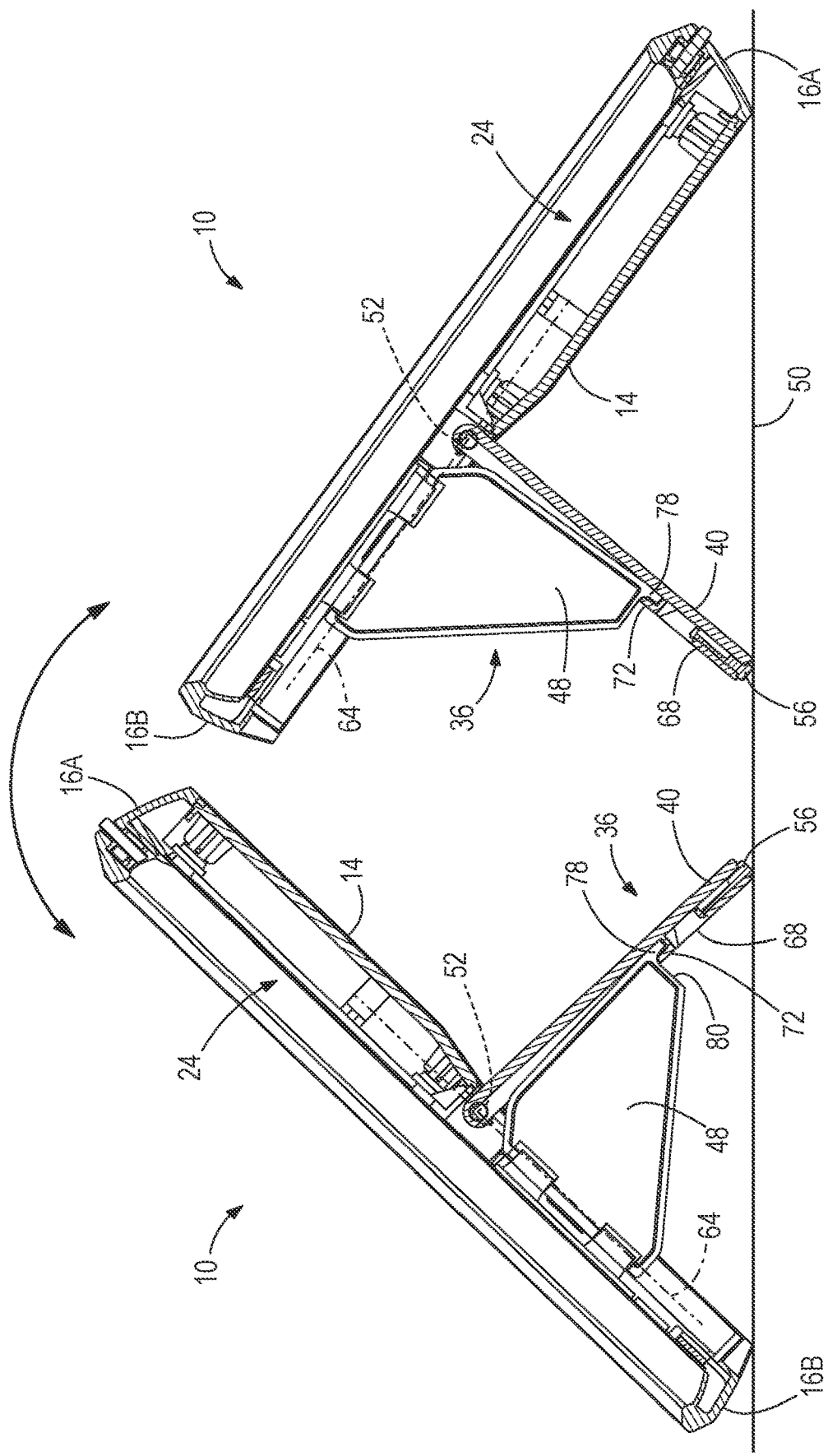
FIG. 4B is a cross-sectional side view of the case of FIG. 1 supported in a first orientation and a second orientation.

As shown in FIG. 4B, the kickstand arrangement 36 further supports the portable electronic device 12 in a flipped or upside-down configuration. In both of the normal orientation (as shown in, for example, FIGS. 1, 4A, 6, and 7) and the flipped orientation, a long side (upper sidewall 16A, lower sidewall 16B) of the case 10 contacts the horizontal support surface 50. In an alternative embodiment, the kickstand arrangement 36 may be oriented such that a short side (left sidewall 16C, right sidewall 16D) of the case 10 contacts the horizontal support surface 50. Rotating the case 10 between the normal orientation and the flipped orientation involves rotating the case approximately 180 degrees. It may be desirable to flip the case 10 in a number of different scenarios. As shown in FIG. 4B, the flipped orientation may provide a modified display angle of the portable electronic device 12. Further, the portable electronic device 12 may function as a point-of-sale device, and flipping the portable electronic device between normal and flipped orientations may quickly reposition the portable electronic device between a first position for receiving input from a cashier/employee and a second position for receiving input from a customer.

In order to support the case 10 in the flipped orientation, the second and third kickstands 44, 48 are positioned in their second (support) positions. If the second and third kickstands 44, 48 are rotated to their first (stowed) positions, the first kickstand 40 is unable to support the case 10 in the angled, support position shown in FIG. 4B, but would instead collapse to the first, stowed position from the weight of the case 10 and portable electronic device 12. As such, the second and third kickstands 44, 48 not only provide additional rigidity to the kickstand arrangement (compared to the first kickstand 40 used alone) but also allow the case 10 to be supported by the first kickstand 40 in the flipped orientation.

In operation, the case 10 holding the portable electronic device 12 is transitioned from a stowed position in which the kickstand arrangement 36 does not support the portable electronic device 12 at an angle (e.g., 45 degrees) relative to the horizontal support surface 50, to a support position in which the kickstand arrangement 36 supports the portable electronic device 12 at an angle (e.g., 45 degrees) relative to the horizontal support surface 50. A user engages the first kickstand 40 (i.e., at a cutout near the ground engagement edge 56) to rotate the first kickstand 40 about its rotational axis 52 from the stowed position to the support position. The first kickstand 40 is inhibited from extending past the support position by contact with the rear wall 14 of the case 10. The user engages the second and third kickstands 44, 48, rotating them about their respective rotational axes 60, 64 to their support positions. In their support positions, the second and third kickstands 44, 48 are rotated into engagement with the peripheral guide 72 and rotational stop 76. Now in the support position, the kickstand arrangement 36 supports the portable electronic device 12 in the standard orientation and, if the user flips the portable electronic device 12 and case 10, in the flipped orientation, as shown in FIG. 4B.

What is claimed is:

1. A case for a portable electronic device, the case comprising:
a cavity defined by a plurality of sidewalls and a rear wall and configured to support the portable electronic device therein; and
a kickstand arrangement coupled to the rear wall, the kickstand arrangement comprising a first kickstand rotatable about a first rotational axis between a stowed position and a support position and a second kickstand rotatable about a second rotational axis transverse to the first rotational axis, wherein the second kickstand is configured to rotate into an auxiliary support position in which the second kickstand extends between the rear wall and the first kickstand,
wherein the second kickstand is coupled to the rear wall, and wherein the second kickstand is rotatable into selective engagement with the first kickstand in the auxiliary support position and is rotatable out of engagement with the first kickstand.

2. The case of claim 1, further comprising a third kickstand rotatable about a third rotational axis that is parallel to the second rotational axis, wherein the third kickstand is configured to rotate into another auxiliary support position in which the third kickstand extends between the rear wall and the first kickstand.

3. The case of claim 2, wherein the second kickstand is rotatable in a first direction toward the auxiliary support position, and wherein the third kickstand is rotatable in a second direction toward the another auxiliary support position that is opposite the first direction.

4. The case of claim 1, wherein the second rotational axis extends perpendicular to the first rotational axis.

5. The case of claim 1, wherein, when the first kickstand is in the support position and the second kickstand is in the auxiliary support position, the case is configured to support the portable electronic device in a first orientation, in which a first sidewall of the plurality of sidewalls and the first kickstand engage a horizontal support surface, and in a second orientation, in which a second sidewall of the plurality of sidewalls, opposite the first sidewall, and the first kickstand engage the horizontal support surface.

6. The case of claim 1, wherein, when the first kickstand is in the stowed position, the second kickstand is sandwiched between the first kickstand and the rear wall.

7. The case of claim 1, wherein the first kickstand includes a peripheral guide and the second kickstand includes a lip that is configured to slide within the peripheral guide.

8. The case of claim 1, further comprising a rotational stop located on the first kickstand and configured to interface with the second kickstand when the second kickstand is in the auxiliary support position to inhibit rotation of the second kickstand beyond the auxiliary support position.

9. A case for a portable electronic device, the case comprising:
a cavity defined by a plurality of sidewalls and a rear wall and configured to support the portable electronic device therein; and
a kickstand arrangement coupled to the rear wall, the kickstand arrangement comprising a first kickstand rotatable about a first rotational axis between a first stowed position and a first support position and a second kickstand rotatable about a second rotational axis transverse to the first rotational axis between a second stowed position and a second support position, wherein the second kickstand is inoperable to rotate from the second stowed position to the second support position when the first kickstand is in the first stowed position, and wherein the second kickstand is operable to rotate from the second stowed position to the second support position when the first kickstand is in the first support position,
wherein the second kickstand is inaccessible from outside of the cavity when the first kickstand is in the first stowed position.

10. The case of claim 9, wherein, when the first kickstand is in the first stowed position, the second kickstand is sandwiched between the first kickstand and the rear wall.

11. The case of claim 9, wherein the second kickstand is accessible through the cavity when the first kickstand is in the first stowed position.

12. The case of claim 9, further comprising a third kickstand rotatable about a third rotational axis between a third stowed position and a third support position, the third rotational axis being parallel to the second rotational axis, wherein the third kickstand is inoperable to rotate from the third stowed position to the third support position when the first kickstand is in the first stowed position, and wherein the third kickstand is operable to rotate from the third stowed position to the third support position when the first kickstand is in the first support position.

13. The case of claim 12, wherein the second kickstand is rotatable in a first direction toward the second support position, and wherein the third kickstand is rotatable in a second direction toward the third support position that is opposite the first direction.

14. The case of claim 12, wherein each of the second kickstand and the third kickstand is configured to engage the first kickstand in the second and third support positions, respectively.

15. The case of claim 12, wherein the second rotational axis extends perpendicular to the first rotational axis.

16. The case of claim 12, wherein, when the first kickstand is in the first support position and the second kickstand is in the second support position, the case is configured to support the portable electronic device in a first orientation, in which a first sidewall of the plurality of sidewalls and the first kickstand engage a horizontal support surface, and in a second orientation, in which a second sidewall of the plurality of sidewalls, opposite the first sidewall, and the first kickstand engage the horizontal support surface.

17. A case for a portable electronic device, the case comprising:
a cavity defined by a plurality of sidewalls and a rear wall and configured to support the portable electronic device therein; and
a kickstand arrangement coupled to the rear wall, the kickstand arrangement comprising a first kickstand rotatable about a first rotational axis between a stowed position and a support position and a second kickstand rotatable about a second rotational axis transverse to the first rotational axis, wherein the second kickstand is configured to rotate into an auxiliary support position in which the second kickstand extends between the rear wall and the first kickstand; and wherein the kickstand arrangement further includes a third kickstand rotatable about a third rotational axis that is parallel to the second rotational axis, wherein the third kickstand is configured to rotate into another auxiliary support position in which the third kickstand extends between the rear wall and the first kickstand.

18. The case of claim 17, wherein the second kickstand is rotatable in a first direction toward the auxiliary support position, and wherein the third kickstand is rotatable in a second direction toward the another auxiliary support position that is opposite the first direction.

19. A case for a portable electronic device, the case comprising:
   a cavity defined by a plurality of sidewalls and a rear wall and configured to support the portable electronic device therein; and
   a kickstand arrangement coupled to the rear wall, the kickstand arrangement comprising a first kickstand rotatable about a first rotational axis between a stowed position and a support position and a second kickstand rotatable about a second rotational axis transverse to the first rotational axis, wherein the second kickstand is configured to rotate into an auxiliary support position in which the second kickstand extends between the rear wall and the first kickstand,
   wherein the first kickstand includes a peripheral guide and the second kickstand includes a lip that is configured to slide within the peripheral guide.

20. A case for a portable electronic device, the case comprising:
   a cavity defined by a plurality of sidewalls and a rear wall and configured to support the portable electronic device therein;
   a kickstand arrangement coupled to the rear wall, the kickstand arrangement comprising a first kickstand rotatable about a first rotational axis between a stowed position and a support position and a second kickstand rotatable about a second rotational axis transverse to the first rotational axis, wherein the second kickstand is configured to rotate into an auxiliary support position in which the second kickstand extends between the rear wall and the first kickstand; and
   a rotational stop located on the first kickstand and configured to interface with the second kickstand when the second kickstand is in the auxiliary support position to inhibit rotation of the second kickstand beyond the auxiliary support position.

21. A case for a portable electronic device, the case comprising:
   a cavity defined by a plurality of sidewalls and a rear wall and configured to support the portable electronic device therein; and
   a kickstand arrangement coupled to the rear wall, the kickstand arrangement comprising a first kickstand rotatable about a first rotational axis between a first stowed position and a first support position and a second kickstand rotatable about a second rotational axis transverse to the first rotational axis between a second stowed position and a second support position, wherein the second kickstand is inoperable to rotate from the second stowed position to the second support position when the first kickstand is in the first stowed position, and wherein the second kickstand is operable to rotate from the second stowed position to the second support position when the first kickstand is in the first support position,
   wherein, when the first kickstand is in the first stowed position, the second kickstand is sandwiched between the first kickstand and the rear wall.

* * * * *